Sept. 17, 1935.   J. J. AHEARN   2,014,711
LINE HOLDER
Filed Jan. 6, 1934
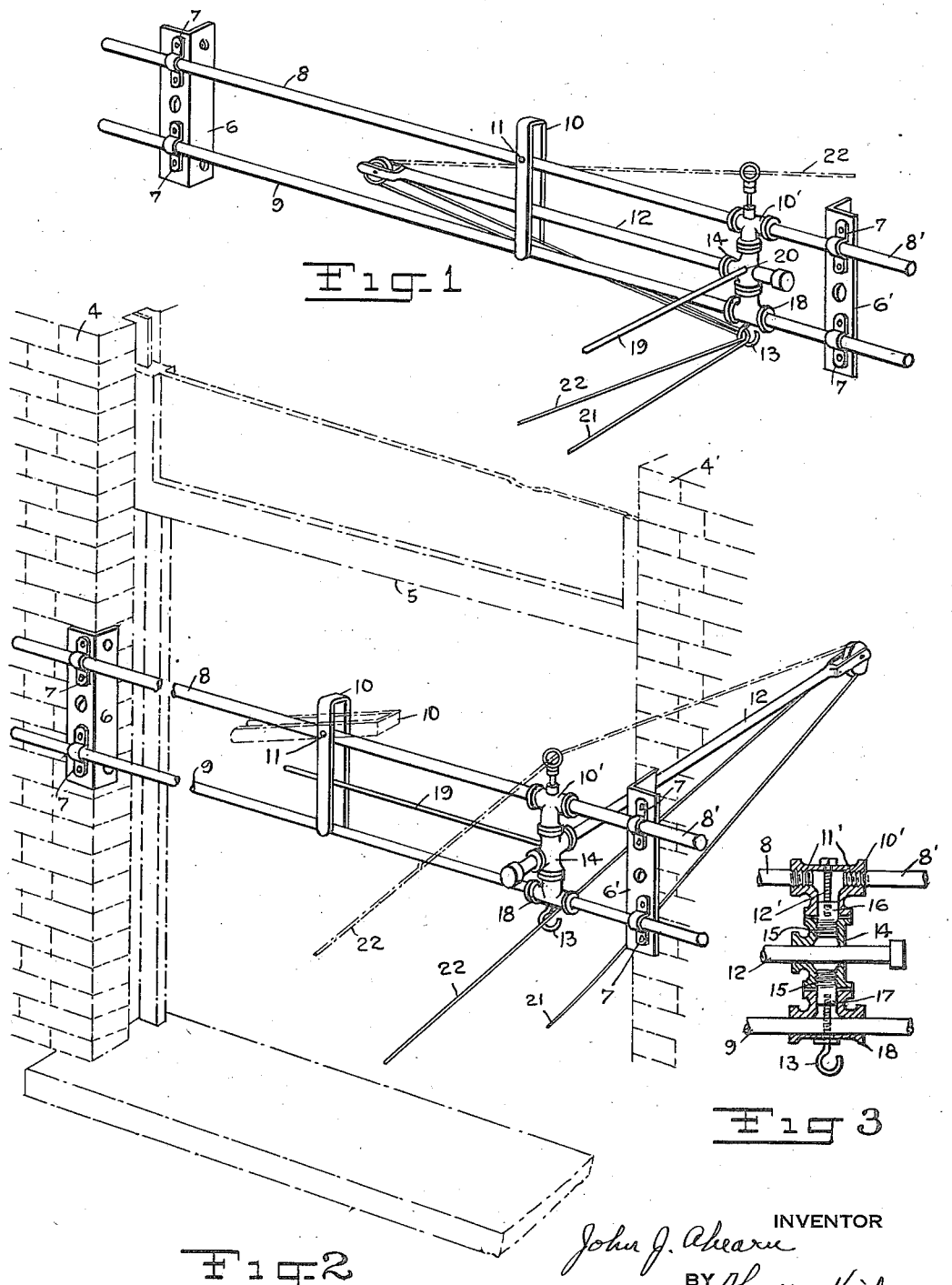
INVENTOR
John J. Ahearn
BY
ATTORNEY Patented Sept. 17, 1935

2,014,711

UNITED STATES PATENT OFFICE 2,014,711

LINE HOLDER

John J. Ahearn, Brooklyn, N. Y.

Application January 6, 1934, Serial No. 705,612

2 Claims. (Cl. 68—3)

My invention relates to improvements in line holding devices and more particularly has reference and is illustrated in the accompanying drawing in its application to a clothes line bracket or frame for use at the outside of a window to facilitate hanging clothes upon the line without reaching outside the window, the line being extended from the window to a pole or other support at a distant point.

Referring to said drawing Fig. 1 illustrates in perspective parts being omitted, a suitable form of line holder embodying an application of my invention the same being shown in closed position. Fig. 2 illustrates the same in opened position or in other words, with the line extended into the room in position to receive the clothes. Fig. 3 is an enlarged longitudinal sectional detail of the arm pivoting means or support parts being broken away.

4, 4' indicate the brick work of the building or house and 5 the sash frame which in Fig. 2 is shown opened or pushed up. 6, 6' indicate angle bars or plates which may be secured to the building proper as shown and which may be provided with supporting straps 7 as shown for securing the bars 8, 9, 10 being a U shaped member pivotally mounted at 11 so as to hang as shown in full outline or to be lifted as shown in dotted outline, the same being for retaining the arm 12 in opened or projected position as shown in Fig. 2 or in closed position as shown in Fig. 1.

The top bar may be of two pieces as indicated at 8' or may be of a single length as shown at 9. In either case a T coupling 10 is employed and when supporting bars such as 8, 8' are used they are threaded for engaging the T coupling as indicated at 11, but where a single bar such as 9 is employed the T coupling is reamed out to allow a bar or tube such as 9 to slide therethrough and in such case the bar is penetrated by a bolt or screw hook such as 12', 13 the same passing through the wall of the T coupling for securing the combination in position.

Another T coupling 14 is also employed as shown and carries the arm 12, and in the ends, top and bottom, of the T coupling 14 are screwed plugs 15 having smooth ends 16, 17 which engage the smoothed bores of the stems of the T couplings 10, 18. These smooth studs 16, 17 serving as pivotal bearings, are drilled to receive the bolt or screw 12' at the top of the screw hook 13 at the bottom. Likewise the shell of the T couplings 10, 18 are preferably drilled and tapped so that when the screw and hook screw are turned down tightly they provide studs or pivots engaging the recesses in the plugs 16, 17 thus providing a pivotal bearing for the arm 12 and its T coupling 14.

19 indicates another arm threaded at one end to engage a threaded hole 20 in the T coupling 14 to secure said arm 19 at right angles to the arm 20 so that when hanging the clothes the arm 19 is engaged by the U shaped member 10 as shown in Fig. 2 and when the clothes are hung and the window closed the arm 12 is engaged in the holder 10.

In hanging the clothes one side 21 of the clothes line is free of the hook 13 while the other side 22 may hang therein as shown. The line extends into the room as shown in Fig. 2 and as the clothes are hung upon the lower portion 21 beneath the arm 12 the line is pushed out through the opened window with the clothes as hung until full after which the lower side 21 of the line is also lifted upon the hook 13, the holder 10 is raised and the arm 12 is pushed leftwardly until parallel with the bars or tubes 8, 9 when the holder 10 is dropped and the window may be closed. For taking the clothes from the line the holder 10 is left out of engagement with the bar 12 and the bar or arm 12 is pulled into the room allowing the holder 10 to drop over the arm 19 so as to retain the arm 12 securely in position. The side 21 of the line 22 is now lifted off the hook 13 and the clothes are pulled in through the window and removed after which the arm 12 may again be engaged beneath the holder 10 and the window closed thus providing a simple, strong and economical, easily attached device for holding and manipulating the clothes line from the inside of the room without danger of falling from the window.

Of course it will be understood that various modifications may be made in the construction and arrangements of parts without departing from the spirit of the invention as claimed.

I claim:

1. A line holding device of the class described comprising a cross frame adapted to be secured outside of and span a window, an arm pivotally secured upon said frame, a pulley at the free end of said arm, line engaging means adjacent said pivot, and means in combination with said frame for retaining said arm within or outside said window, said last mentioned means including an arm pivotally connected with said frame and a second arm rigidly connected to and extending at right angles to said first mentioned arm.

2. A line holding device of the class described comprising a frame adapted to be secured outside a window, an arm pivotally secured upon said frame, a pulley at the free end of said arm, line engaging means adjacent said pivot, means in combination with said frame for retaining said arm within or outside said window, said last mentioned means comprising a U shaped member pivotally mounted upon said frame and an arm connected with and extending at right angles to said first mentioned arm for engagement by said U-shaped member for retaining said arm in extended position inside said window.

JOHN J. AHEARN.